United States Patent [19]

Stevenson

[11] Patent Number: 5,460,307

[45] Date of Patent: Oct. 24, 1995

[54] CONVERTIBLE BACKPACK AND WHEELED CARGO BED

[76] Inventor: Bruce E. Stevenson, 1006 Red Butte Ave., Cody, Wyo. 82414

[21] Appl. No.: 90,577

[22] Filed: Jul. 12, 1993

[51] Int. Cl.⁶ .................................................. A45F 4/02
[52] U.S. Cl. ............................................................ 224/153
[58] Field of Search ........................... 224/153, 155, 224/156

[56] References Cited

U.S. PATENT DOCUMENTS

| | | | |
|---|---|---|---|
| 3,266,686 | 8/1966 | Griffith | 224/155 |
| 3,990,536 | 11/1976 | Wilburn | 224/155 X |
| 4,022,292 | 5/1977 | Van Gompel | 224/155 X |
| 4,368,835 | 1/1983 | Murphy | 224/153 |
| 4,593,841 | 6/1986 | Lange | 224/153 |
| 4,885,812 | 12/1989 | Lindner | 224/156 X |
| 5,209,381 | 5/1993 | Jay | 224/155 |

FOREIGN PATENT DOCUMENTS

1194851  6/1970  United Kingdom ................... 224/155

*Primary Examiner*—Renee S. Luebke
*Attorney, Agent, or Firm*—Risto A. Rinne, Jr.

[57] ABSTRACT

An improved backpack is described as including a frame assembly having a first closed position and a second open position and cooperating with a fabric shell in both the first closed position and the second open position. In the first closed position the fabric shell forms a compartment useful for containing cargo items. In the second open position the fabric shell provides a bed useful for placing large or heavy cargo items on. Detachable wheels are included that separate apart from an axle that is attached to the frame. The wheels are not used in the first closed position and are transported inside the compartment as additional cargo items. The wheels are attached to each end of the axle when the frame is pivoted into the second open position and are useful in maneuvering the improved backpack over the ground surface.

18 Claims, 4 Drawing Sheets

CONVERTIBLE BACKPACK AND WHEELED CARGO BED

BACKGROUND OF THE INVENTION

1. Field of the Invention

The present invention, in general, relates to devices that are used to manually transport cargo items and, more particularly, to backpacks.

Backpacks are well known types of outdoor equipment. They are used by hikers to transport clothing, food, and shelter to and from remote locations. Certain smaller, lighter duty types of backpacks are constructed entirely of fabric and do not require any supporting type of frame structure.

However most conventional types of backpacks that are used to satisfy heavier duty types of cargo transportation requirements rely upon a cooperating frame type of structure. The frame is usually constructed of either aluminum, graphite, or titanium tubing, or the like, and is designed so as to cooperate with a fabric shell.

The frame is either located inside the fabric shell or it may be located external to the fabric shell and is fastened thereto. A method of securing the backpack about the waist is usually provided along with support straps that pass over the shoulders of the user. The fabric shell of most conventional types of backpacks will contain one or more compartments for the storage of goods that are to be transported.

There are two limitations that are generally shared by such types of backpacks. Conventional types of backpacks are inherently limited with regard to both the maximum size or bulk and the maximum amount of weight of the cargo items that can thus be transported.

The maximum weight capacity is limited by the structure of the backpack and by the strength of the user. Most users do not feel comfortable if their loaded backpack weighs more than about one-third of their own body weight.

Therefore a 150 pound hiker would most likely find it uncomfortable to transport over 50 pounds in his backpack and would find it almost unbearable to transport 150 pounds in his backpack, assuming of course that there was sufficient compartmental room in the backpack to house that much weight of cargo. Consequently, in order to allow for the transportation of very heavy loads, a device having wheels is usually preferred by most users.

The size of the cargo that may be transported is limited, in general, to that which can be stored (fit) within the fabric shell compartments. Certain items, such as sleeping bags or fishing poles, are occasionally strapped to the exterior of the backpack.

However, certain very large items are too awkward to transport in or even on a conventional backpack. If a very large item were to be fastened to the exterior of a backpack it would be difficult to maneuver about in timber with the item protruding from the backpack.

Furthermore, a bulky heavy item strapped to the exterior of a conventional type of backpack affects the center of gravity adversely. This is because the bulky item tends to move the center of gravity further away from the spine of the user. In order to maintain balance the user is compelled to lean forward. If a heavy enough item is placed in or on a backpack and is situated far enough away from the spine of the user, the user cannot stand erect but will be forced to lean too far forward to feel comfortable while either standing or walking.

There are numerous occasions that arise when it is desirable to use a backpack for the transportation of large or heavy items. For example in remote wilderness group or base campsites, it is desirable to be able transport large tents, supplies, and the like to the site. These items may remain at the base campsite for extended periods of time while the inhabitants occasionally leave for and return from various excursions.

Therefore a backpack that is capable of transporting very large items to the campsite is a useful device. Ideally such a backpack would then readily adapt to accommodate smaller items, such as the clothing and foodstuffs that are used during the daily excursions.

In addition it is sometimes necessary when returning from hiking expeditions to be able to transport much heavier cargo items than were initially carried into the field. Such an example is clear to anyone who has had a companion become immobilized by an injury while in remote areas. A companion hiker who sprains an ankle or even worse, breaks a leg, for example, will need to be assisted out of the wilderness. A backpack that can adapt, when necessary, to satisfy such a purpose is desirable for hikers, campers, hunters, and field workers, and would also provide benefit to search and rescue personnel as well.

Another similar type of need is experienced by big game hunters who travel on foot. Such hunters may spend days in the field without success. While they travel by foot they often utilize a backpack to carry the extra clothes, food, and supplies that they require during the day while hunting. However when they are successful in killing a deer, elk, or the like a device that is useful to aid in transporting the game animal out of the woods is then required. Carts have been devised to satisfy this purpose however most hunters prefer not to transport such types of carts into the woods for reasons of vanity as the utility of such types of carts is obvious even when unladen.

While the need for an improved backpack is clearly desirable, most users will continue to prefer a more traditional looking type of backpack while they are on foot. If the need to transport a particularly large or heavy item arises, the visual aesthetics become far less important while the functional ability to transport such types of items is elevated in importance. Therefore an improved backpack that is generally traditional in appearance when it is used for the transport of small or light cargo items is preferred.

Accordingly there exists today a need for an improved backpack that is capable of functioning similar to conventional backpacks and, when desired, is readily convertible into a wheeled cart that is useful to transport especially heavy or bulky cargo items.

2. Description of Prior Art

Backpacks and carts, in general, are known. For example, the following patents describe various types of collapsible carts and back carried carts:

U.S. Pat. No. 547,288 to Remington, Oct. 1, 1895;

U.S. Pat. No. 2,401,986 to Talbot, Jun. 11, 1946;

U.S. Pat. No. 2,918,296 to Goodale, Dec. 22, 1959;

U.S. Pat. No. 3,054,622 to Davis et al, Sep. 18, 1962;

U.S. Pat. No. 3,236,537 to Eckman, Feb. 22, 1966;

U.S. Pat. No. 3,860,254 to Wegener, Jan. 14, 1975.

While the structural arrangements of the above described devices, at first appearance, have similarities with the present invention, they differ in material respects. These differences, which will be described in more detail hereinafter, are essential for the effective use of the invention and

3 which admit of the advantages that are not available with the prior devices.

OBJECTS AND SUMMARY OF THE INVENTION

It is an important object of the present invention to provide an improved backpack that cooperates with a fabric shell in a first closed position and in a second open position.

It is also an object of the invention to provide an improved backpack that is convertible to a second open position for the transport of especially heavy loads or large loads as desired.

Still another object of the invention is to provide an improved backpack that is conventional in appearance when transporting small or light loads.

Yet another object of the invention is to provide an improved backpack that relies upon detachable wheels for the transportation of large or heavy cargo items.

Briefly, an improved backpack that is constructed in accordance with the principles of the present invention includes a pivotable frame structure having fastened thereto a fabric shell. The pivotable frame structure and fabric shell pivot into a first closed position forming a conventional looking backpack with the fabric shell situated about the frame forming a compartment for the storage of cargo items therein. Two removable wheels are stored inside the compartment and are transported as cargo items when the backpack is carried about the back of a user. When heavy or bulky cargo items are to be transported, the backpack is removed off of the back of the user, the wheels are removed from inside of the compartment, and the frame and the fabric shell are pivoted into a second open position. In the second open position the fabric shell continues to cooperate with the frame to form a cargo bed useful to support various cargo items including heavier and larger types of cargo items than could otherwise be contained within the compartment. The wheels are fastened to each end of an axle which is provided as a part of the backpack frame. Extensible handles are attached to the frame and are extended for use in maneuvering the improved backpack, much like a cart, when the backpack frame is in the second open position and the wheels are attached.

DETAILED DESCRIPTION OF THE INVENTION

Figure 1:
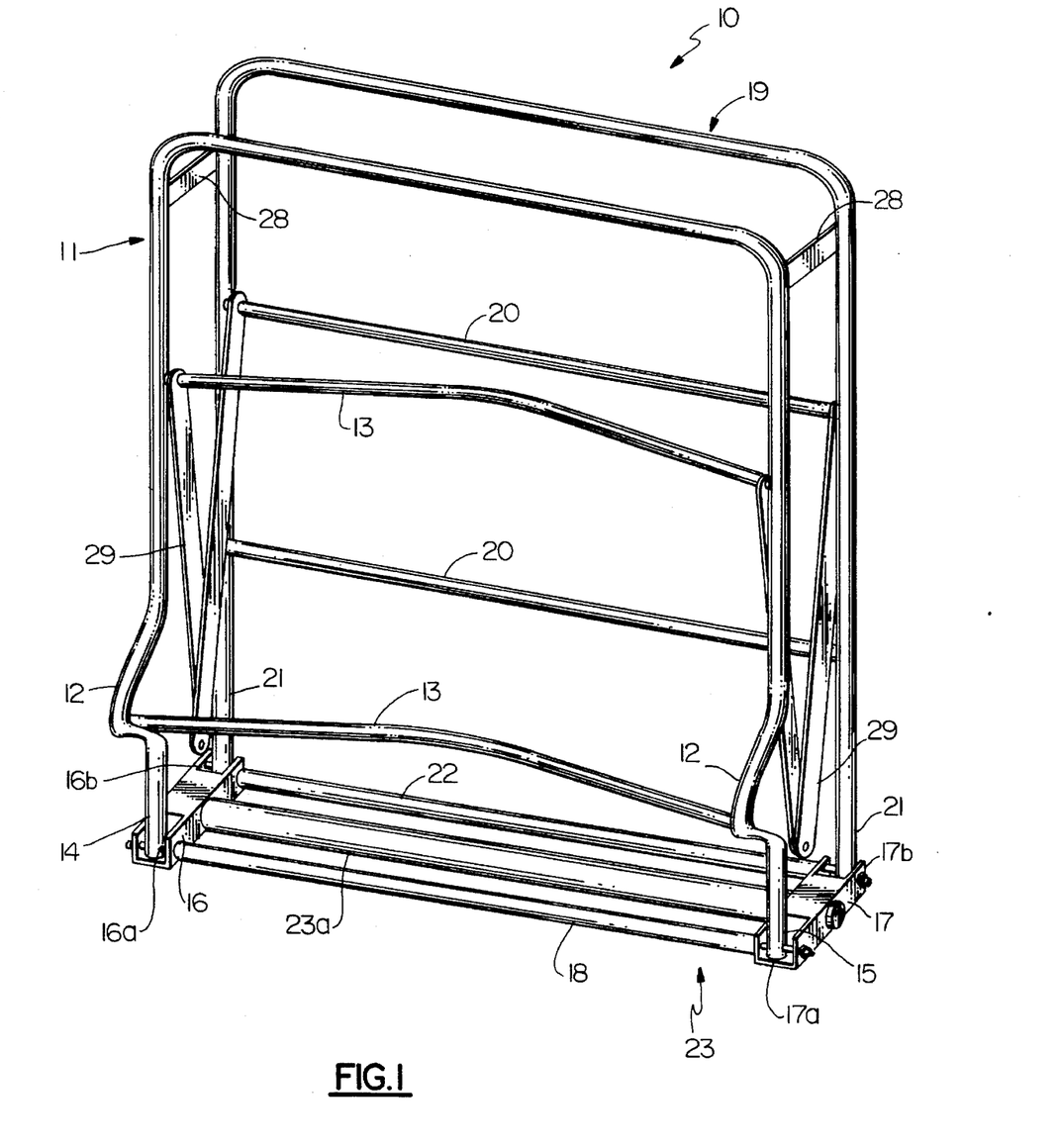
FIG. 1 is a view in perspective of the frame of the improved backpack in the first closed position.

Referring to FIG. 1 is shown, a frame portion of an improved backpack, identified in general by the numeral 10. The frame 10 is preferably constructed of a metallic type of tubing to provide increased strength and minimum weight. While aluminum or titanium alloy tubing is often preferred, any suitable material is used for the construction of the frame 10, including graphite fiber and like types of materials.

The frame 10 as shown is in a first closed position. A fabric shell (identified generally by reference numeral 30, FIG. 3.) that surrounds the frame 10 is omitted from the FIG. 1 drawing to reveal improved clarity of construction of the frame 10, and is described in greater detail hereinbelow. The first closed position as shown is the normal position for transport of the improved backpack while it is being carried against the back of a user (not shown). The improved backpack may also be transported, after having been pivoted into a second open position and after a pair of wheels (identified as reference numeral 24, FIG. 2 and FIG. 3) have been installed thereto, by rolling on its wheels over the ground surface similar to a cart, and is described in greater detail hereinbelow.

General types of backpack frames (not shown) are well known components that are used in the construction of heavier duty types of backpacks. Backpack frames are designed to be contained either substantially inside of a fabric material which surrounds the backpack frame or are instead situated substantially outside of, or external to, the fabric material. Each of the two general types of locations for the backpack frame has its advantages and its disadvantages, and each location is a choice made by each backpack manufacturer.

The frame 10 of the improved backpack varies in construction from general types of backpack frames and is described in greater detail hereinbelow. The frame 10 as disclosed is contained inside the fabric shell 30 although it could equally well be situated externally with respect to the fabric shell 30. The frame 10 is a reinforcing type of structure which provides the necessary amount of structural integrity as well as rigidity to the improved backpack. The frame 10 also provides a first closed position and a second open position, and is adapted to receive wheels 24, as is described in greater detail hereinbelow.

While a preferred type of embodiment is disclosed herein, it is considered obvious to those skilled in the art of building backpacks to make various types of modifications to the improved backpack disclosed herein, including to modify either the location of the frame 10 with respect to the fabric shell 30 or to modify certain aspects of the frame 10 construction in order to carry either larger or smaller cargo items (not shown) as well as to permit carrying heavier or lighter types of cargo items, as is desired.

Figure 2:
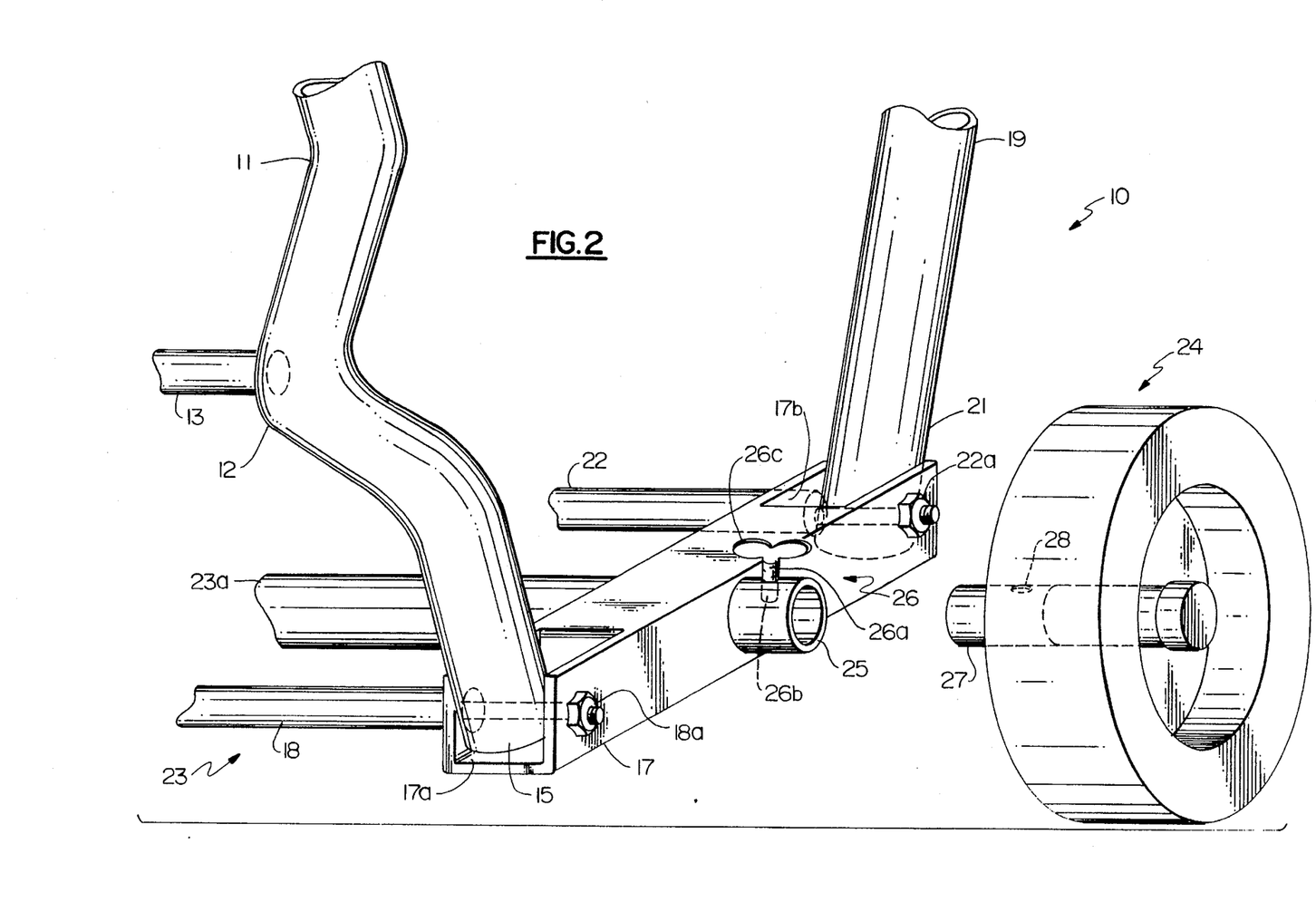
FIG. 2 is an enlarged view in perspective of a portion of the frame of the improved backpack of FIG. 1.

Referring now also to FIG. 2, the frame 10 is comprised of a first substantially rectangular assembly structure 11 having in general a "U" shape. The first rectangular structure 11 defines, in general, a rectangular planar area. A lumbar portion 12 having a curvature thereto is provided as desired to the first rectangular structure 11 to allow the frame 10 to better cooperate with the spinal curvature of the user. The lumbar portion 12 adapts well to the lumbar curvature of the spine when the improved backpack is carried by the user.

First cross members 13 are attached where desired to the first rectangular structure 11. The first cross members 13 improve the strength of the frame 10, in general, and cooperate with the fabric shell 30 as load bearing members when the frame 10 is pivoted into the second open position, as is described in greater detail hereinbelow. The generally "U" shaped first rectangular structure 11 includes a first end 14 and a second end 15, each of which pivotally interconnects with a first pivot block 16 at a first block end 16a and a second pivot block 17 at a second block end 17a.

A first spacer rod 18 having generally smaller diameter ends than a center portion is situated between the first and second pivot blocks 16, 17 with a first rod end of the first spacer rod 18 passing through a hole provided in the first end 14 when the first end 14 is placed within the first block end 16a and also passing through a pair of holes that are provided in the first block end 16a that also are in alignment with each other.

The first rod end of the first spacer rod 18 is then secured in position by methods that are known in the art such as by a retaining pin (not shown) passing through an opening that is provided near the first rod end of the first spacer rod 18, or by a first nut (reference numeral 18a FIG. 2) engaging with threads located at the first rod end of the first spacer rod 18. The remaining second rod end of the first spacer rod 18 passes through a hole provided in the second end 15 when the second end 15 is placed within the second block end 17a and also passes through a pair of holes provided in the second block end 17a that are in alignment with each other.

The first spacer rod 18 serves to maintain the first pivot block 16 at a predetermined distance apart from the second pivot block 17 and also provides a point about which the first end 14 and the second end 15 of the first rectangular structure 11 are able to pivot with respect to first and second pivot blocks 16, 17.

The first pivot block 16 and second pivot block 17 are each constructed so as to form a substantially "U" shaped channel at the first block end 16a and second block end 17a and at the first block remaining end 16b and the second block remaining end 17b. The first block end 16a and second block end 17a are each adapted for receiving the first end 14 and second end 15 of the first rectangular structure 11.

The frame 10 includes a second substantially rectangular shaped assembly structure 19 having in general a "U" shape. The second rectangular structure 19 defines, in general, a rectangular planar area. Second cross members 20 are attached to the second planar surface 18 where desired for strength.

The generally "U" shaped second rectangular assembly structure 19 includes two structure ends 21, each of which pivotally interconnect with the first block remaining end 16b and second block remaining end 17b of the first pivot block 16 and second pivot block 17 respectively.

A second spacer rod 22 having generally smaller diameter ends than a center portion is disposed a predetermined distance apart from and parallel with the first spacer rod 18. The second spacer rod 22 is situated between the first and second pivot blocks 16, 17 with each of the smaller diameter ends of the second spacer rod 22 passing through a hole that is provided in each of the two structure ends 21 when they are placed within the first block remaining end 16b and the second block remaining end 17b and also passing through a pair of holes that are provided in alignment with each other in the first block remaining end 16b and second block remaining end 17b.

The second spacer rod 22 is secured in position by a second nut (reference numeral 22a FIG. 2) engaging with threads located at each end of the second spacer rod 22.

The second spacer rod 22 serves to maintain the first pivot block 16 at a predetermined distance apart from the second pivot block 17 and also provides a point about which the two structure ends 21 of the second rectangular structure 19 are able to pivot with respect to first and second pivot blocks 16, 17.

The first and second pivot blocks 16, 17 maintain the first end 14 and second end 15 of the first rectangular structure 11 a predetermined distance apart from the two structure ends 21 of the second rectangular structure 19 and also allow the first rectangular structure 11 and the second rectangular structure 19 to pivot independently of each other and to pivot about the first and second spacer rods 18, 22.

As was discussed hereinabove, the first and second spacer rods 18, 22 maintain the first and second pivot blocks 16, 17 at a predetermined spaced apart relationship with respect to each other and also provide a pivot point about which the first end 14 and second end 15 of the first rectangular structure 11 and the two structure ends 21 of the second rectangular structure 19 may pivot. In addition, the first and second spacer rods 18, 22 also provide improved strength to a platform assembly (identified in general by the reference numeral 23) that is comprised of the first and second spacer rods 18, 22, an axle 23a, and the first and second pivot blocks 16, 17.

According to a modification the first and second pivot blocks are modified (not shown) so as to be attached integral with the two structure ends 21 of the second rectangular structure 19. According to this modification the second rectangular structure 19 does not pivot about the modified first and second pivot blocks, but rather is attached thereto. The first rectangular structure 11 pivots at the two ends (not shown) of the modified first and second pivot blocks.

Essentially the same modification is achieved by attaching the modified first and second pivot blocks to the first end 14 and second end 15 of the first rectangular structure 11 and by pivotally connecting the second rectangular structure 19 thereto.

However, it is preferred to pivotally interconnect both the first and the second rectangular structures 11, 19 to the pivot blocks 16, 17 as shown in the FIG. 1 drawing in order to provide the platform assembly 23 as was hereinabove described, which tends to be self leveling when the improved backpack is pivoted into the second open position and the wheels 24 are attached thereto. The self leveling attribute of the platform assembly 23 provides the maximum amount of ground clearance possible.

The first cross members 13 and second cross members 20 as shown represent only a portion of those members as are usually included in the construction of the first and second rectangular structures 11, 19. Additional cross members are not shown to allow for better clarity of view of the component parts of the frame 10 and also because the quantity and the location of the additional members will vary depending upon the characteristics desired for each particular version constructed of the improved backpack.

For example in the construction of heavy duty types of improved backpacks with a particularly heavy load carrying capacity, additional angular cross members (not shown) are used on either the first or second rectangular structures 11, 19 which are aligned either perpendicular to or at an angle with respect to the first and second cross members 13, 20 of the first and second rectangular structures 11, 19 respectively. The angular cross members connect certain of the cross members 13, 20 together with certain other cross members 13, 20 that are also located on the same first or second rectangular structure 11, 19 or they connect certain of the cross members 13, 20 to the perimeter of either the first or second rectangular structures 11, 19 of which they are included as a part thereof.

Certain of the first cross members 13 are constructed to have a slight curvature as they extend across the first rectangular structure 11 to better accommodate the curvature of the back of the user when the improved backpack is carried thus. By including the slight curvature to the shape of certain of the first cross members 13, the improved backpack conforms better with the anatomy of the user thereby eliminating pressure points on the back of the user, thus making it easier to carry the improved backpack for extended periods of time.

The axle 23a is disposed between the two pivot blocks 16, 17 and also disposed between and parallel to the first and second spacer rods 18, 22. The axle 23a adds strength and serves also to provide a location to affix a pair of wheels (reference numeral 24 of FIG. 2 showing one of two wheels). The wheels 24 are attached to the axle 23a for use only when the improved backpack is pivoted into the second open position and is wheeled along the ground surface instead of carried on the back by the user.

The axle 23a has two axle ends 25 that protrude out from the pivot blocks 16, 17 and are useful for attaching the wheels thereto. The axle 23a is secured to the two pivot blocks 16, 17 by screw threads (not shown) that are provided in the axle ends 25 and by cooperating screw threads that are provided in the pivot blocks 16, 17, or by welding the axle 23a to the pivot blocks 16, 17.

The wheels 24 are attachable to and removable apart from the axle ends 25 either by a spring loaded latching mechanism 26 or by screw type threads (not shown) that are provided in the axle ends 25 and by cooperating screw type threads that are provided on a wheel stem 27.

The preferred spring loaded latching mechanism 26 includes a spring 26a attached to each of the axle ends 25 and to a pull shank 26b. The spring 26a supplies a force upon the pull shank 26b which tends to urge the pull shank 26b to retract into a pull shank hole that is provided in the axle end 25. A pull ring 26c is attached to the pull shank 26b and is used to extract the pull shank 26b out of the shank hole to permit quick insertion and fastening thereto of the wheel stem 27 into the axle end 25, or quick removal of the wheel stem 27 apart from the axle end 25.

The wheel stem 27 includes a stem hole 28 that is adapted for receiving the pull shank 26b thereinto when the wheel stem 27 is properly inserted into the axle end 25 and the pull ring 26c is released.

Also included in the frame 10 are two spacers 28 located between the first and second rectangular structures 11, 19. The two spacers 28 maintain the top portion of the first and second rectangular structures 11, 19 that is located furthest away from the pivot blocks 16, 17 at a predetermined spaced apart relationship with respect to each other.

The two spacers 28 thereby prevent the top portion of the first and second rectangular structures 11, 19 from contacting each other when the improved backpack is carried by the user. This is desirable to maintain the conventional looking rectangular shape of the improved backpack when it is in the first closed position and also to prevent damage from occurring to the contents which are transported inside the improved backpack. The two spacers 28 are attached to either of the first and second rectangular structures 11, 19 by a pin (not shown) or are constructed to be removable therefrom as desired.

Figure 3:
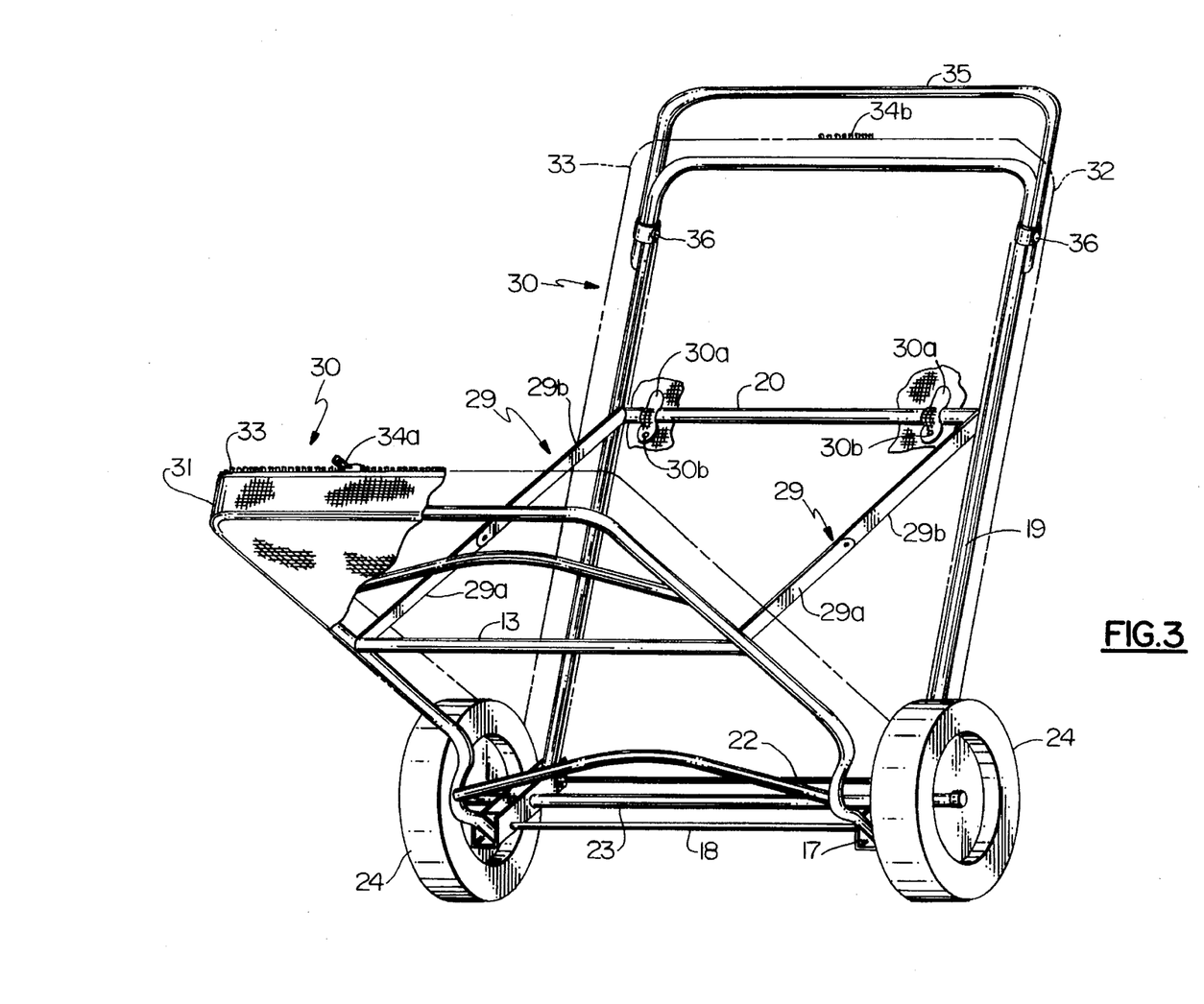
FIG. 3 is a view in perspective of the improved backpack assembled in the second open position.

Referring also on occasion to FIG. 3, a pair of limit strap assemblies (identified in general by the reference numeral 29) are included as having each limit strap assembly 29 comprised of a first limit strap 29a pivotally attached at a first end to one of the first cross members 13 and pivotally attached to a first end of a second limit strap 29b at the remaining second end thereof. The second end of the second limit strap 29b is pivotally attached to one of the second cross members 20 at the end opposite to where it is pivotally attached to the first limit strap 29a.

The first end of the first limit strap 29a of each limit strap assembly 29 is pivotally attached on each side of the first rectangular structure 11 of the frame 10 by placing one of the first cross members 13 through a pivot strap hole (not shown) that is provided through the first end of each first limit strap 29a during assembly of the first rectangular structure 11. A retaining pin (not shown) or retaining pin in cooperation with a retainer spring (not shown) is used to maintain each first end of each first limit strap 29a in position against each side of the first rectangular structure 11.

Similarly, the second end of each of the second limit straps 29b is pivotally attached on each side of the improved backpack to one of the second cross members 20 by placing one of the second cross members 20 through a strap pivot hole (not shown) that is provided through the second end of each second limit strap 29b during assembly of the second rectangular structure 19 and by similarly retaining it in position against the sides of the second rectangular structure 19.

Referring now again to FIG. 1, the pair of limit strap assemblies 29 are shown in the first closed position of the improved backpack as occurs when the improved backpack is to be carried about the back of the user. Referring now to FIG. 3, the pair of limit strap assemblies 29 are shown at maximum extension when the frame 10 is in the second open position as is used when the improved backpack is to be rolled upon the ground surface.

The length of the first limit strap 29a and of the second limit strap 29b are selected to determine and to limit the maximum allowable distance that is permitted between the first and second rectangular structures 11, 19 when the improved backpack is pivoted into in the second open position.

Referring now primarily to FIG. 3, is shown the improved backpack with the frame 10 as having been pivoted into the second open position and having the wheels 24 attached thereto. A fabric shell (identified in general by the reference numeral 30) is provided which includes a first fabric half 31 and a second fabric half 32. The fabric shell 30 is constructed of a natural fabric material or of a synthetic material, such as nylon, or the like. The density of weave of the fabric material is as desired and for certain types of the fabric shell 30 the density of weave of the fabric material that is used may be as loose and open as desired providing that it is able to hold the desired cargo items that are to be carried by the backpack.

The first fabric half 31 is attached to the first rectangular structure 11 of the frame 10 where desired and extends generally along the planar area as is defined by the first rectangular structure 11.

The second fabric half 32 is attached to the second rectangular structure 19 of the frame 10 where desired and extends generally along the planar area as is defined by the second rectangular structure 19.

The fabric shell 30 is secured to the frame 10 by fabric snap tabs 30a, each tab 30a having an end that is sewn to one of the fabric halves 31, 32 where desired and having a first half of a snap 30b located generally near the opposite end. A second half of a snap (not shown) is also sewn or crimped to one of the fabric halves 31, 32 where desired and is adapted for receiving the first half of a snap 30b when pressed together.

The snap tabs 30a are placed around one of the cross members 13, 20 or around a perimeter portion of the frame 10 prior to pressing the first half of a snap 30b on top of the second half of a snap. The use of snap tabs 30 provides for a fabric shell 30 that may be readily detached apart from the frame 10 for cleaning or replacement.

The first and second fabric halves 31, 32 each include along the perimeter thereof an upstanding fabric wall 33 projecting away from the first and second fabric halves 31, 32 and in a direction that is, generally, towards each of the other upstanding fabric walls 33.

Attached substantially along the perimeter of the upstanding fabric walls 33 of the first and second fabric halves 31, 32 are included a zipper first half 34a and a zipper second half 34b (Only a portion of the zipper halves 34a, 34b is shown.).

When the frame 10 is pivoted into the first closed position (FIG. 1) and the zipper halves 34a, 34b are fastened together the fabric shell 30 cooperates with the frame 10 to form a fabric enclosure compartment comprised of fabric material sides and walls. The frame 10 supplies the structural integrity necessary to maintain the substantially rectangular shape of the compartment.

The corresponding zipper halves 34a, 34b cooperate with each other to secure the frame 10 of the improved backpack in the first closed position for carrying by the user. During transport of the improved backpack upon the back of the user, the fabric enclosure compartment is used to contain cargo items to be transported, such as is common with general types of backpacks.

The fabric enclosure compartment also is used to contain and to transport the two wheels 24 when the improved backpack frame 10 is in the first closed position. The fabric shell 30 also contains internal fabric pockets (not shown) and external fabric pockets (not shown) which themselves form smaller compartments, as are generally well known in the art of making backpacks. The smaller compartments are useful to segregate and to contain various cargo items.

In particular internal fabric pockets are provided to house the two wheels 24 during transport of the improved backpack when it is carried in the first closed position.

An extensible handle 35 having an extended position and a retracted position is attached to either one, or to both, of the rectangular structures 11, 19 and is extensible therefrom to aid in maneuvering the improved backpack over the ground surface when the wheels 24 are attached and the frame 10 of the improved backpack has been pivoted into the second open position. A clamp 36 is used to secure the extensible handle 35 in either of the extended or retracted positions.

According to a modification a telescoping extensible handle (not shown) is included which is telescopically attached to a modified rectangular structure (not shown). The telescoping extensible handle has an outside diameter that is smaller than the inside diameter of the modified rectangular structure and is adapted to fit therein. The telescoping extensible handle is retracted within the modified rectangular structure and is secured thereto when the frame 10 is in the first closed position. The telescoping extensible handle is extended out from the modified rectangular structure and is secured thereto and is used for maneuvering when the frame 10 is in the second open position. The extensible handle 35 or the modified telescoping extensible handle is extended out and away from the fabric shell 30 by flexing the fabric shell 30 back and away from the extensible handle 35.

The first closed position of the improved backpack resembles the appearance and manner by which conventional types of backpacks are normally carried. When the frame 10 of the improved backpack is in the first closed position and is situated about the user during transport it must be secured (fastened) to the user by some method. As is common with other general types of backpacks a great variety of fastening systems are available for use with the improved backpack.

The improved backpack, when the frame 10 is in the first closed position, relies upon well known methods for securing the backpack against the back of the user including the use of shoulder straps (not shown), waist bands (not shown), and the like.

A preferred type of fastening system for the improved backpack includes a pair of shoulder straps (not shown), the ends of which are affixed to the frame 10 where desired and which passes through the fabric shell 30 (only if the type of frame 10 is internal with respect to the fabric shell 30) and over the shoulders of the user. A waist belt (not shown) is also included, the ends of which fasten to the frame 10, generally near to where the lower ends of each of the shoulder straps are fastened. The waist belt passes around the waist of the user and includes a center buckle (not shown) for fastening the ends together.

OPERATION

Unless large or especially heavy cargo is to transported, the improved backpack is usually transported in the closed first position. The zipper halves 34a, 34b maintain the frame 10 in the first closed position. Cargo is placed inside the compartment formed by the fabric shell 30.

To open the backpack and to adapt it for use in the second open position, the zipper 34 is loosened along its entire length, the wheels 24 are removed from inside of the fabric compartment and are attached to the axle 23a, and the first rectangular structure 11 is grasped and pulled apart from the second rectangular structure 19 so as to pivot it generally away from the second rectangular structure 19 until the limit strap assemblies 29 are both maximally extended. The clamps 36 are loosened and the extensible handle 35 is extended, and the clamps are re-tightened.

The improved backpack is now in the second open position. The fabric shell 30 extends along each of the planes as are defined by the first rectangular structure 11, the second rectangular structure 19, and the platform assembly 23 to provide a bed for placing cargo upon such as game animals, injured people, and other types of especially bulky or heavy cargo.

Figure 4:
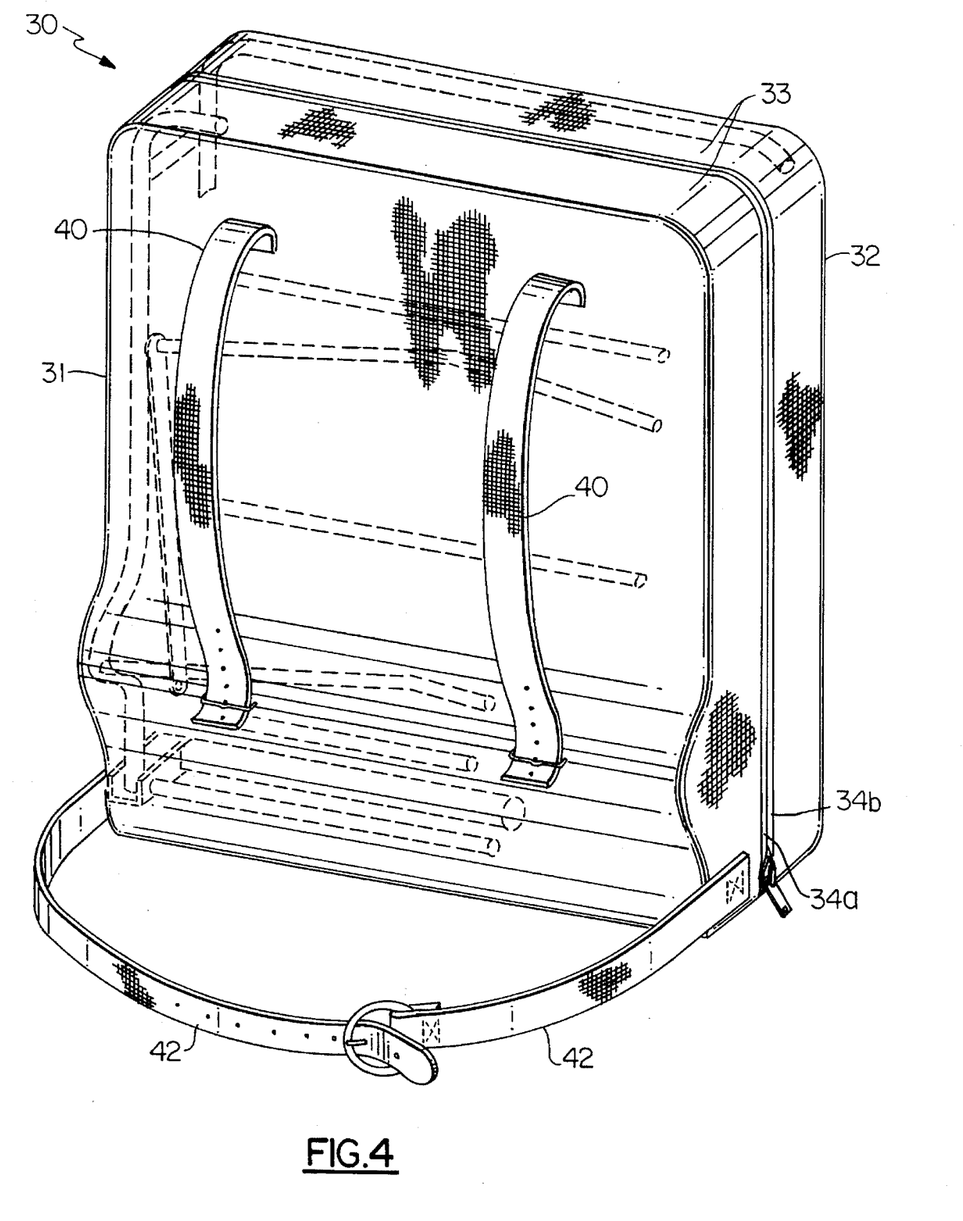
FIG. 4 is a view in perspective of the backpack in the first closed position.

The frame 10 continues to cooperate with the fabric shell 30 in the second open position to supply the structural strength and integrity necessary to support cargo that is placed upon the fabric shell 30. Referring to FIG. 4, is shown a portion of the frame 10 of the backpack (as hidden lines) inside of the fabric shell 30 when the backpack is in the first closed position. The fabric halves 31, 32 are joined together by the zipper halves 34a, 34b to form a large compartment. A pair of shoulder straps 40 are shown for securing the backpack adjacent to a back of a user (not shown) when in the first closed position. Each one of the shoulder straps 40 pass over a shoulder (not shown) of the user and is adjustable for length by any method as desired that is well known. A waist strap 42 is attached as desired and passes around a waist (not shown) of the user to further aid in transport.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An improved backpack for transport of cargo items, comprising:

a fabric shell;

a reinforcing frame structure including means for defining a first substantially planar area, and means for defining a second substantially planar area;

a pivot axis for pivotally interconnecting said means for defining a first substantially planar area with said means for defining a second substantially planar area;

said reinforcing frame structure having a first position wherein said means for defining a first substantially planar area is disposed substantially parallel to and at a predetermined distance apart from said means for defining a second substantially planar area and having a second position wherein said means for defining a first substantially planar area is pivoted about said pivot axis so that it is disposed at an angle with respect to said means for defining a second substantially planar area;

said fabric shell disposed adjacent to said means for defining a first substantially planar area and to said means for defining a second substantially planar area to provide a compartment for housing said cargo items therein at said first position and the inside of said fabric shell adapted to provide a cargo bed for placing said cargo items on at said second position, at least one wheel attachable to said reinforcing frame structure for providing support of said reinforcing frame structure above a surface as said reinforcing frame structure cooperates with said fabric shell to form said cargo bed in said second position, and having said at least one wheel removable apart from said reinforcing frame structure as said reinforcing frame structure cooperates with said fabric shell to form said compartment in said first position, whereby in said second position said cargo bed is adapted to be wheeled over said surface, and wherein said reinforcing frame structure includes a first strap and a second strap whereby said first strap is pivotally attached at one end thereof to said means for defining a first substantially planar area and is pivotally attached at the remaining end thereof to said second strap at a first end of said second strap and said second strap is pivotally attached to said means for defining a second substantially planar area at a second end of said second strap wherein said first strap and said second strap provide a means for limiting the range of pivotal motion between said means for defining a first substantially planar area and said means for defining a second substantially planar area.

2. The improved backpack of claim 1 wherein said pivot axis includes a platform assembly having a first pivot axis for pivotally connecting said means for defining a first substantially planar area thereto and having a second pivot axis for pivotally connecting said means for defining a second substantially planar area thereto.

3. The improved backpack of claim 2 wherein said platform assembly includes at least one axle that is adapted for receiving said at least one wheel.

4. The improved backpack of claim 2 wherein said first pivot axis includes a spacer rod.

5. The improved backpack of claim 2 wherein said second pivot axis includes a spacer rod.

6. The improved backpack of claim 1 wherein said at least one wheel includes a plurality of wheels.

7. The improved backpack of claim 1 wherein said fabric shell includes a zipper.

8. The improved backpack of claim 1 wherein said frame structure includes an axle adapted for receiving said at least one wheel.

9. The improved backpack of claim 8 wherein said axle includes means for attaching said at least one wheel thereto and means for releasing said at least one wheel therefrom.

10. The improved backpack of claim 9 wherein said means for attaching said wheel means thereto and means for releasing said wheel means therefrom includes latching mechanism means.

11. The improved backpack of claim 1 wherein said reinforcing frame structure means is disposed internally with respect to said fabric shell means.

12. The improved backpack of claim 1 wherein said reinforcing frame structure includes at least one shoulder strap attached thereto that is useful for carrying said improved backpack by a person.

13. The improved backpack of claim 1 wherein said reinforcing frame structure includes a waist strap attached thereto that is useful for carrying said improved backpack.

14. The improved backpack of claim 1 wherein said fabric shell includes cloth material.

15. The improved backpack of claim 1 wherein said fabric shell includes synthetic material.

16. An improved backpack for transport of cargo items, comprising:

a fabric shell;

a reinforcing frame structure including means for defining a first substantially planar area, and means for defining a second substantially planar area;

a pivot axis for pivotally interconnecting said means for defining a first substantially planar area with said means for defining a second substantially planar area;

said reinforcing frame structure having a first position wherein said means for defining a first substantially planar area is disposed substantially parallel to and at a predetermined distance apart from said means for defining a second substantially planar area and having a second position wherein said means for defining a first substantially planar area is pivoted about said pivot axis so that it is disposed at an angle with respect to said means for defining a second substantially planar area;

said fabric shell disposed adjacent to said means for defining a first substantially planar area and to said means for defining a second substantially planar area to provide a compartment for housing said cargo items therein at said first position and the inside of said fabric shell adapted to provide a cargo bed for placing said cargo items on at said second position, at least one wheel attachable to said reinforcing frame structure for providing support of said reinforcing frame structure above a surface as said reinforcing frame structure cooperates with said fabric shell to form said cargo bed in said second position, and having said at least one wheel removable apart from said reinforcing frame structure as said reinforcing frame structure cooperates with said fabric shell to form said compartment in said first position, whereby in said second position said cargo bed is adapted to be wheeled over said surface, and wherein said reinforcing frame structure includes an extensible handle.

17. The improved backpack of claim 16 wherein said extensible handle includes a telescopically extensible handle adapted to cooperate with a portion of said frame structure, said telescopically extensible handle attached to said frame structure and adapted to be extended and retracted with respect to said frame structure.

18. An improved backpack for transport of cargo items, comprising:

a fabric shell;

a reinforcing frame structure including means for defining a first substantially planar area, and means for defining a second substantially planar area;

a pivot axis for pivotally interconnecting said means for defining a first substantially planar area with said means for defining a second substantially planar area;

said reinforcing frame structure having a first position wherein said means for defining a first substantially planar area is disposed substantially parallel to and at a predetermined distance apart from said means for defining a second substantially planar area and having a second position wherein said means for defining a first substantially planar area is pivoted about said pivot axis so that it is disposed at an angle with respect to said means for defining a second substantially planar area;

said fabric shell disposed adjacent to said means for defining a first substantially planar area and to said means for defining a second substantially planar area to provide a compartment for housing said cargo items therein at said first position and the inside of said fabric shell adapted to provide a cargo bed for placing said cargo items on at said second position, and at least one wheel attachable to said reinforcing frame structure for providing support of said reinforcing frame structure above a surface as said reinforcing frame structure cooperate with said fabric shell to form said cargo bed in said second position, and having said at least one wheel removable apart from said reinforcing frame structure as said reinforcing frame structure cooperates with said fabric shell to form said compartment in said first position, whereby in said second position said cargo bed is adapted to be wheeled over said surface, and wherein said reinforcing frame structure includes lumbar curvature means for adapting said reinforcing frame structure to cooperate with a spinal curvature of a person carrying said backpack.

* * * * *